219-121

5/13/86 OR 4,588,871

United States Patent [19]

[11] Patent Number: 4,588,871

[45] Date of Patent: May 13, 1986

Etcheparre et al.

[54] FABRIC CUTTING APPARATUS AND METHOD

[76] Inventors: Bernard Etcheparre; Jean Etcheparre, both of 67, quai des Chartrons, 33000 Bordeaux, France

[21] Appl. No.: 377,366

[22] Filed: May 12, 1982

[30] Foreign Application Priority Data

May 20, 1981 [FR] France ................................ 81 10187

[51] Int. Cl.4 ................................................ B23K 27/00

[52] U.S. Cl. ................................. 219/121 LG; 83/87; 83/161; 83/423; 219/121 LN

[58] Field of Search .................. 219/121 LG, 121 LN; 83/87, 90–92, 100, 423, 161, 925 CC

[56] References Cited

U.S. PATENT DOCUMENTS

| | | | |
|---|---|---|---|
| 2,151,703 | 3/1939 | Kaplan | 164/19 |
| 3,110,207 | 11/1963 | Shuster | 83/87 |
| 3,269,235 | 8/1966 | Crouch | 83/99 |
| 3,304,820 | 2/1967 | Muller et al. | 83/925 CC |
| 3,582,466 | 6/1971 | Quirk | 219/121 LG X |
| 3,769,488 | 10/1973 | Hasslinger | 219/121 LN |
| 4,039,799 | 8/1977 | Stumpf | 219/121 LV X |

FOREIGN PATENT DOCUMENTS

| | | | |
|---|---|---|---|
| 1399661 | 4/1965 | France . | |
| 1461447 | 11/1966 | France . | |
| 637249 | 12/1978 | U.S.S.R. | 219/121 L X |

*Primary Examiner*—C. L. Albritton

[57] ABSTRACT

The present invention relates to a method and apparatus for cutting pieces of fabrics of uniform thickness and for stacking these pieces. The method generally includes arranging and maintaining a length of unrolled fabric on a cutting table which comprises a revolving cylinder which rotates so that the length of fabric is positioned to face a cutting instrument. The fabric is cut out according to one or more predetermined patterns when the cylinder stops rotating. Displacement of the cutting instrument over the circumference of a cylinder follows the generators of the cylinder during its motion. After the fabric is cut, the cylinder rotates to deposit the cutout pieces onto a fixed or mobile receiving/stacking table which is positioned under the cylinder. During such deposition, a new length of fabric is simultaneously arranged on the cylinder preparatory to being cut. Alternately, a conveyor belt can be used in lieu of the cylinder.

29 Claims, 2 Drawing Figures

FABRIC CUTTING APPARATUS AND METHOD

BACKGROUND OF THE INVENTION

1. Field of the Invention

The present invention relates to a process and apparatus for cutting fabric of uniform thickness and for stacking the pieces which have been so cut.

2. Discussion of Prior Art

Currently, the practice in manufacturing ready-made clothes, specifically in industries using natural or synthetic fabric, is to cut out the fabric by any appropriate means in which the fabric is arranged in successive layers on a flat table, e.g., a cutting table. The fabric is arranged in accordance with one or more patterns in such a way as to obtain, in a single operation, a plurality of identical cut-out pieces. This process, although generally advantageous, presents a variety of disadvantages when the fabric is stacked. The process of stacking fabric is a long, laborious and delicate operation, due to the necessity of stacking each layer of fabric in the direction of the fabric width, and providing equal tension in the direction of the length of the fabric. This operation is further complicated when the fabric has imprints thereon, such as checks or flowers, because of the necessity of superimposing identical imprints in a precise fashion.

SUMMARY OF THE INVENTION

The object of the present invention is to overcome the inconveniences discussed above.

It is, accordingly, an object of the present invention to provide a method and apparatus for cutting and stacking fabric of uniform thickness.

The present invention is provided for by arranging and maintaining a length of unrolled fabric on the mobile surface of a cutting table. The cutting table may be an endless conveyor held in a moveable fashion between two drums, or it can be a cylinder. The conveyor or cylinder is displaced in order to urge the unrolled fabric, at a defined tension, in the direction of a cutting instrument. The fabric is cut or severed when the displacement of the conveyor, or rotation of the cylinder, is terminated. According to the pattern chosen for the articles to be cut, the fabric pieces are provided in a continuous fashion by cutting instruments, e.g., laser beams, ultrasound equipment, or cutting rollers, which are integrally connected to mobile supports. After the predetermined length of fabric maintained on the flat conveyor or cylinder is cut out according to a desired pattern or patterns, the cutout pieces are subsequently arranged on a receiving table which is placed under the cutting table simultaneously with the fabric cutting process, in order to arrange the identical cutout fabric pieces at definite locations. The receiving table may be rigidly positioned, in which case the conveyor or cylinder will be displaced, or the receiving table may be moveable under a rigidly-fixed conveyor or cylinder. During displacement of the endless conveyor or rotation of the cylinder and deposition of the cutout pieces, a new length of fabric is arranged on the cutting table in order to be, in turn, cut out either according to identical patterns or to different patterns. All of the operations, e.g., cutting, depositing, positioning, verification, can be synchronized by a computer to which the different elements are linked.

BRIEF DESCRIPTION OF THE DRAWINGS

Other characteristics and advantages of the present invention will become clearer to those or ordinary skill in the art from the description which follows, made with reference to the attached drawings, which are given by way of non-limiting example, wherein.

DETAILED DESCRIPTION OF THE DRAWINGS

Figure 1:
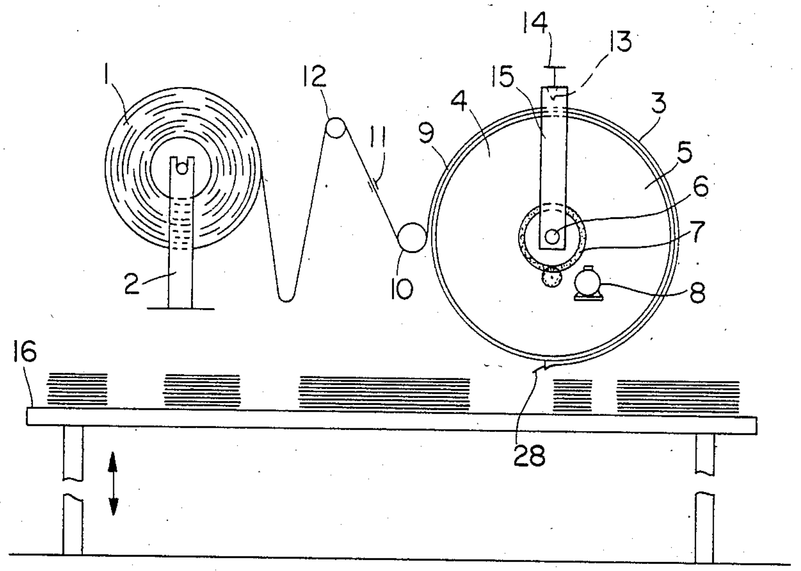
FIG. 1 is a schematic view of a cutting machine having a cylindrical cutting table.

As shown in FIG. 1, fabric piece 1 is maintained on support 2, which support is rotatably driven in order to spool off fabric to feed a fabric layer 3 onto a cutting table 4. The cutting table comprises a revolving cylinder 5 which is maintained on an axle 6 and which is rotatably driven by, e.g., toothed pinion 7 and electric motor 8 in such a way as to distribute fabric layer 3 onto the lateral side 9 of cylinder 5 during its rotation, when the fabric is normally held in the direction of its length. Pressure roller 10 exerts pressure on the generators of cylinder 5 during rotation of the cylinder to permit adhesion of the fabric layer 3 onto cylinder 5. The cylinder has been, e.g., previously coated with glue or has had pricks or other stabilizing or immobilizing elements placed thereon for maintaining fabric layer 3 to prevent displacement of the fabric layer, both in its lengthwise and width-wise directions. The edges of fabric 3 are perfectly aligned on cylinder 5, due to the presence of photo-electric cells 11, which are arranged along both sides of the fabric and which cause roller 12 to be displaced transversely in such a way as to unwind the fabric edges in a defined position. After a predetermined length of fabric 3 has been arranged on lateral surface 9 of cylinder 5, the cylinder and the fabric thereon rotate around one or more cutting instruments 13, e.g., laser beams, ultrasound equipment, or rollers. Cylinder 5 is then immobilized, and fabric 3 is cut out according to one or more patterns and is maintained on guide rail 14, which is located in a parallel fashion to the generators of cylinder 5. The guide rail moves in the direction of the generators of the cylinder because of the translating elements. Guide rail 14 is supported by rotating arms 15, which are integrally connected at their other ends to axle 6, which when driven in rotation by an appropriate element causes displacement of guide rail 14, and therefore cutting instruments 13, over a portion of the circumference of lateral surface 9. This displacement, which is simultaneous with the constant or variable speed of guide rail 14 and instruments 13, permits the fabric to be bias cut. After fabric 3, positioned on cylinder 5, is cut out, cylindrical cutting table 4 is rotatably driven, during which time the pieces of fabric cut out in accordance with the predetermined pattern or patterns are deposited in defined positions on fixed receiving table 16. Table 16 is arranged under the cylindrical cutting table, which has its longitudinal positioned transversely to the axis of cylinder 5. In order to deposit pieces of fabric in their defined positions along receiving table 16, support 2 for fabric 1 and cylindrical cutting table 4 must be moveable along the longitudinal axis of receiving table 16. In order to permit stacking of identical pieces, the height of receiving table 16 must be adjusted as individual pieces are deposited. During rotation of cylinder 5 and the deposition of the cutout pieces, fabric is simultaneously unrolled from piece 1 and is then distributed and pulled onto lateral surface 9 of cylinder 5.

Lateral surface 9 is adapted to be used with any number and type of cutting instruments which require a supporting surface of elevated resistance and hardness. Lateral surface 9 can, however, always be pierced by the cutting instruments which are used.

The control of different elements, and all of the functions of the cutting apparatus, are adapted to be synchronized and defined by means of a computer.

Figure 2:
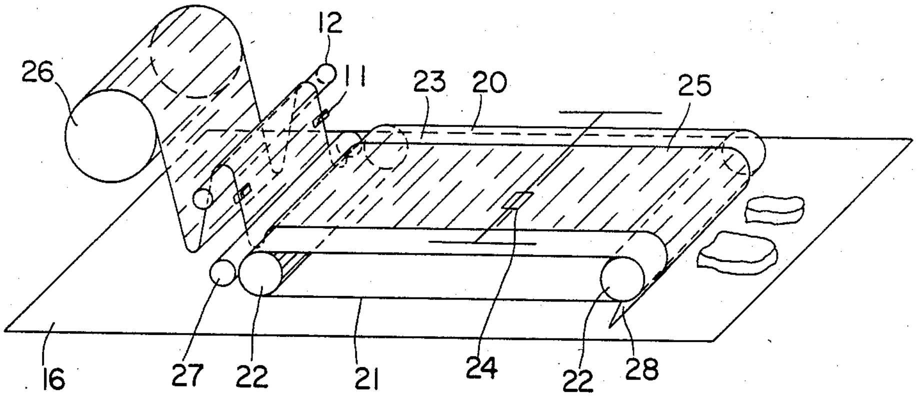
FIG. 2 is a schematic view of a cutting machine having a cutting table which comprises an endless conveyor belt moving between two return drums.

FIG. 2 illustrates another embodiment of the present invention in which cylinder 5 is replaced by table 20.

Table 20 comprises an endless, uniform, and flexible conveyor 21 having interlocking links or flat elements which are journalled together by materials which are appropriate for cutting instruments 24. Conveyor 21 rotates around return drums 22. The length of fabric 25 rolled out from roll 26 is held at one end of table 20 and is arranged on surface 23 of endless conveyor 21. During positioning of fabric 20, the fabric is held along the direction of its length and is maintained on mobile conveyor 21, which has either been previously coated with glue or provided with pricks or other elements for maintaining the material on pressure roller 27. When conveyor 21 stops, the length of fabric is thereby arranged to face cutting instruments 24, which are maintained and directed by a beam and by one or more mobile carts such as those described in French Patent Application No. 7723575, which was filed in the names of the present inventors. The fabric is then cut out in accordance with one or more patterns. After the fabric is cut, conveyor 21 displaces the severed fabric so as to be arranged on receiving table 16 at predetermined positions. A new length of fabric is then unrolled from element 26 and is positioned to face cutting instruments 24.

In order to remove fabric from cylinder 5 or from endless conveyor 21, a detacher 28 can be arranged to press on the cylinder or on the endless conveyor in order to detach the cutout pieces of fabric and to deposit them on mobile receiving table 16.

According to an alternative embodiment of the present invention, receiving table 16 can be mobile with respect to its longitudinal axis. In this fashion, the entire support for the cutting table and for the fabric pieces will be fixed, and will thus provide receiving locations which face the cutout pieces during their deposition, and during rotation of cylinder 5 or displacement of endless conveyor 21.

After positioning fabric on the endless conveyor or on cylinder 5, either before, during or after the fabric is cut, the pieces to be cut can be identified or marked in a manner known to those of skill in the art; this identification or marking can be controlled by the computer in order to facilitate distribution of the fabric pieces when they are subsequently used.

What is claimed is:

1. A method of continuously severing and stacking uniform thickness fabric pieces onto a receiving table, said method comprising:.

(a) positioning and maintaining said fabric on a cutting table;

(b) severing pieces of said fabric according to a predetermined pattern by using a cutting means which is attached to a guide rail, said guide rail also being attached to said cutting table by two rotatable arms, said rotatable arms being attached to an axis of said cutting table and being positioned above said cutting table; and (c) depositing said severed pieces onto said receiving table, said severed pieces being deposited at predetermined locations on said receiving table.

2. The method according to claim 1 wherein said fabric is unrolled from a large fabric roll as needed.

3. The method according to claim 1 further comprising positioning said fabric onto said cutting table by a plurality of rollers.

4. The method according to claim 3 wherein one of said rollers is a pressure roller, said pressure roller being positioned adjacent to said cutting table, and said fabric being urged between said pressure roller and said cutting table.

5. The method according to claim 1 wherein said cutting table is cylindrical and rotatable.

6. The method according to claim 1 wherein said cutting table is an endless conveyor belt.

7. The method according to claim 1 wherein said fabric is maintained on said cutting table by glue.

8. The method according to claim 1 wherein said fabric is maintained on said cutting table by pricks.

9. The method according to claim 1 further comprising driving said rotating arms in rotation in order to cause displacement of said cutting means around said cylinder.

10. The method according to claim 1 wherein the displacement of said guide rail and said cutting means causes said fabric to be cut out on a bias.

11. The method according to claim 1 further comprising adjusting the vertical height of said receiving table in order to allow said fabric pieces to be stacked.

12. The method according to claim 1 further comprising moving said cutting table along the longitudinal axis of said receiving table.

13. The method according to claim 1 further comprising moving said receiving table along the longitudinal axis of said cutting table.

14. The method according to claim 1 further comprising synchronizing said steps by means of a computer.

15. An apparatus for continually severing and stacking uniform thickness pieces of fabric, said apparatus comprising:

(a) a cutting table;

(b) cutting means associated with said cutting table; said cutting means being attached to a guide rail, said guide rail being attached to said cutting table by two rotatable arms, said arms being attached to an axis of said cutting table and being positioned above said table; and (c) a receiving table, at least one of said tables comprising means for positioning pieces of said fabric at predetermined locations on said receiving table after said fabric pieces have been cut out while on said cutting table.

16. The apparatus according to claim 15 further comprising a plurality of rollers, said rollers guiding said fabric onto said cutting table.

17. The apparatus according to claim 16 wherein said rollers include a pressure roller, said pressure roller being positioned adjacent to said cutting table.

18. The apparatus according to claim 15 wherein said cutting table is cylindrical and rotatable.

19. The apparatus according to claim 15 wherein said cutting table comprises an endless conveyor belt.

20. The apparatus according to claim 15 further comprising means for maintaining said fabric on said cutting table, said means being glue.

21. The apparatus according to claim 15 further comprising means for maintaining said fabric on said table, said means being pricks.

22. The apparatus according to claim 15 wherein said cutting means is a laser beam.

23. The apparatus according to claim 15 wherein said cutting means is an ultrasound apparatus.

24. The apparatus according to claim 15 wherein said cutting means is a roller cutter.

25. The apparatus according to claim 15 further comprising means for adjusting the height of said receiving table in order to accommodate a stack of pieces of said fabric.

26. The apparatus according the claim 15 further comprising a movable cutting table, said cutting table being adapted to move along the longitudinal axis of said receiving table.

27. The apparatus according to claim 26 wherein said receiving table is rigidly positioned.

28. The apparatus according to claim 15 further comprising a rigidly positioned cutting table.

29. The apparatus according to claim 28 wherein said receiving table is adapted to move along the longitudinal axis of said cutting table.

* * * * *